(12) United States Patent
Shin et al.

(10) Patent No.: US 11,477,429 B2
(45) Date of Patent: Oct. 18, 2022

(54) METHOD FOR PROCESSING IMMERSIVE VIDEO AND METHOD FOR PRODUCING IMMERSIVE VIDEO

(71) Applicants: Electronics and Telecommunications Research Institute, Daejeon (KR); IUCF-HYU (INDUSTRY-UNIVERSITY COOPERATION FOUNDATION HANYANG UNIVERSITY), Seoul (KR)

(72) Inventors: Hong Chang Shin, Daejeon (KR); Gwang Soon Lee, Daejeon (KR); Ho Min Eum, Daejeon (KR); Jun Young Jeong, Seoul (KR); Jong Il Park, Seoul (KR); Jun Young Yun, Namyangju-si (KR)

(73) Assignees: Electronics and Telecommunications Research Institute, Daejeon (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 16/921,563

(22) Filed: Jul. 6, 2020

(65) Prior Publication Data
US 2021/0006764 A1    Jan. 7, 2021

(30) Foreign Application Priority Data

Jul. 5, 2019    (KR) .................. 10-2019-0081605
Sep. 26, 2019   (KR) .................. 10-2019-0119176
Jul. 3, 2020    (KR) .................. 10-2020-0082200

(51) Int. Cl.
*H04N 13/139*    (2018.01)
*H04N 13/172*    (2018.01)
(Continued)

(52) U.S. Cl.
CPC ......... *H04N 13/139* (2018.05); *H04N 13/111* (2018.05); *H04N 13/161* (2018.05); *H04N 13/172* (2018.05)

(58) Field of Classification Search
CPC .. H04N 13/139; H04N 13/172; H04N 13/161; H04N 13/111
(Continued)

(56) References Cited

U.S. PATENT DOCUMENTS 5,532,833 A * 7/1996 Hong .................. G11B 27/11
                                             348/E7.071
8,306,257 B2 * 11/2012 Shiell ................. G06K 9/6219
                                             348/169
(Continued)

FOREIGN PATENT DOCUMENTS

KR    101299245 B1    8/2013
KR    101838320 B1    3/2018
(Continued)

OTHER PUBLICATIONS

Hong Chang Shin et al., A Study on Pruning Order Determination Method in Immersive Video Test Model, 32nd Workshop on Image Processing and Understanding, 2020.2.05-2.07, ETRI.
(Continued)

*Primary Examiner* — Amir Shahnami
*Assistant Examiner* — Jimmy S Lee
(74) *Attorney, Agent, or Firm* — William Park & Associates Ltd.

(57) ABSTRACT

An immersive video processing method according to the present disclosure includes determining a priority order of
(Continued)

pruning for source view videos, generating a residual video for an additional view video based on the priority order of pruning, packing a patch generated based on the residual video into an atlas video, and encoding the atlas video.

3 Claims, 11 Drawing Sheets

(51) Int. Cl.
  *H04N 13/111* (2018.01)
  *H04N 13/161* (2018.01)
(58) Field of Classification Search
  USPC .......................................................... 348/43
  See application file for complete search history.

(56) References Cited

U.S. PATENT DOCUMENTS

| | | |
|---|---|---|
| 2012/0122062 A1 | 5/2012 | Yang et al. |
| 2015/0317057 A1 | 11/2015 | Choi et al. |
| 2019/0320164 A1* | 10/2019 | Salahieh .............. H04N 13/282 |

FOREIGN PATENT DOCUMENTS

| | | |
|---|---|---|
| KR | 101885633 B1 | 8/2018 |
| KR | 101915425 B1 | 11/2018 |
| WO | 2010033151 A1 | 3/2010 |
| WO | 2012033965 A1 | 3/2012 |
| WO | 2012033966 A1 | 3/2012 |

OTHER PUBLICATIONS

Hong-Chang Shin et al., ETRI response to Immersive Video CE-2: Optimized pruning order, Coding of Moving Pictures and Audio, International Organisation for Standardisation, ISO/IEC JTC1/SC29/WG11 MPEG2019/M50030, Oct. 2019, Electronics and Telecommunications Research Institute (ETRI), Geneva, Switzerland.

Test Model 2 for Immersive Video, Coding of moving pictures and audio, ISO/IEC JTC 1/SC 29/WG 11, N18577, Jul. 2019, 29 pages, MPEG-I Video, International Organisation for Standardisation, Uni (Italy), Gothenburg, SE.

Test Model for Immersive Video, Coding of moving pictures and audio, ISO/IEC JTC 1/SC 29/WG 11, N18470, Mar. 2019, International Organisation for Standardisation, Uni (Italy), Geneva, CH.

* cited by examiner

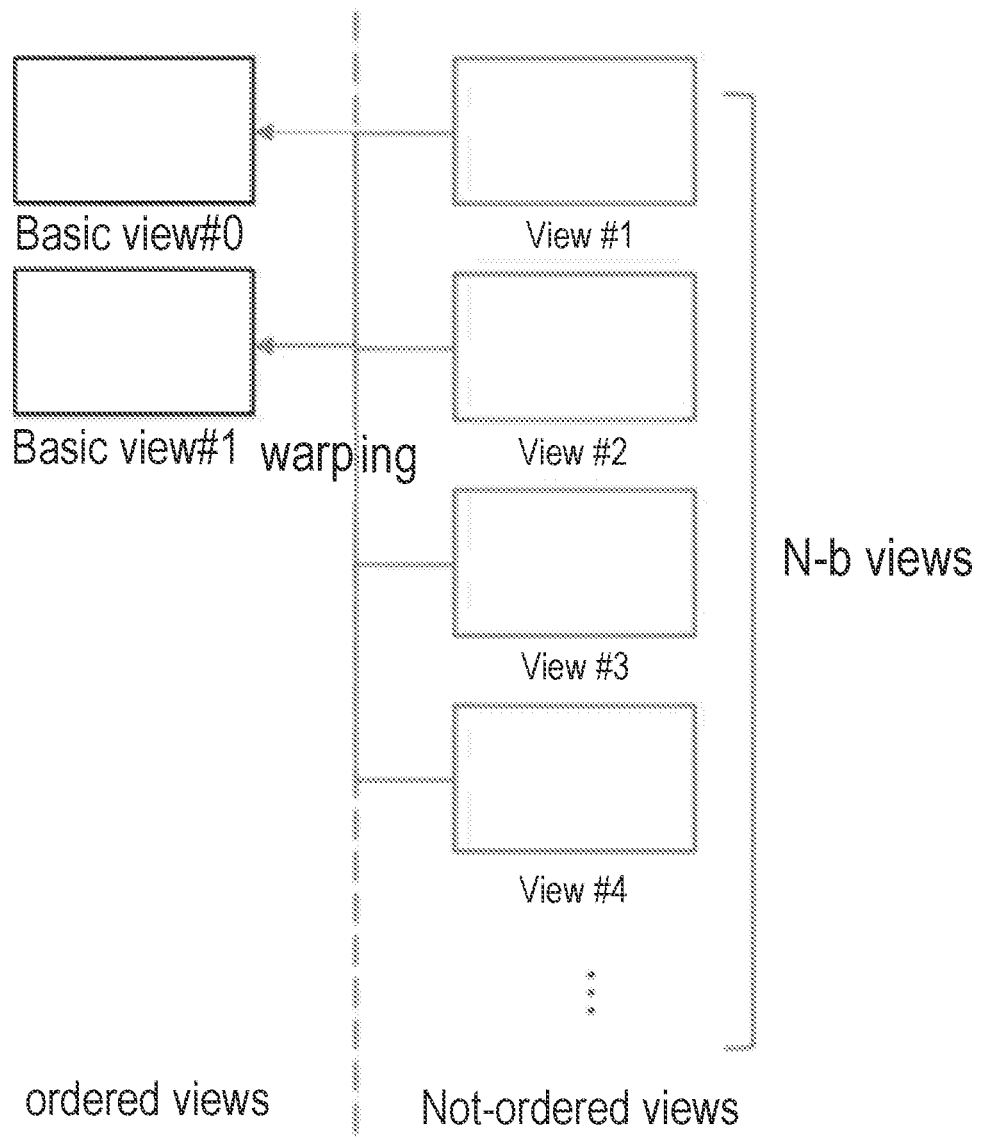

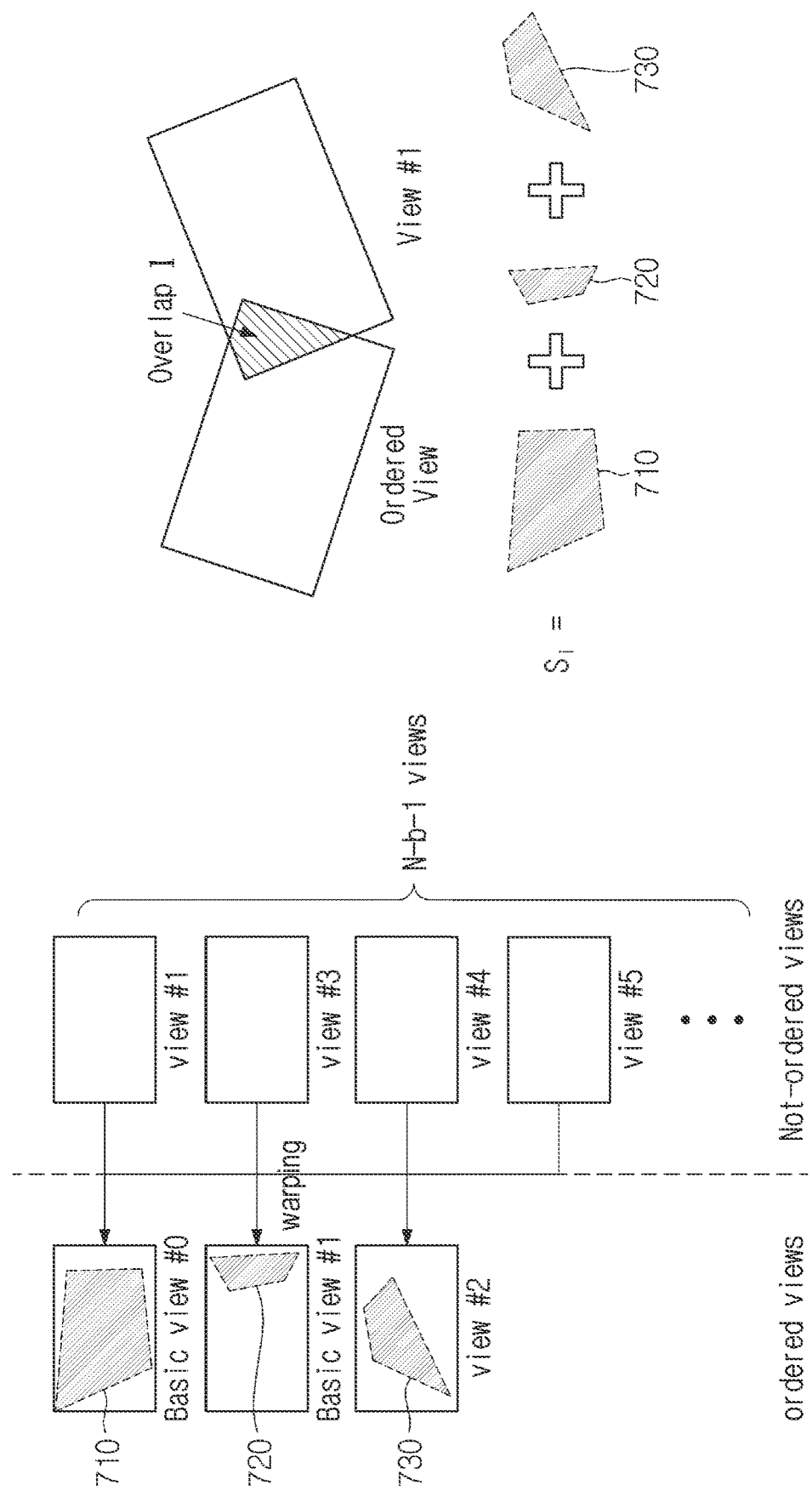

FIG. 8
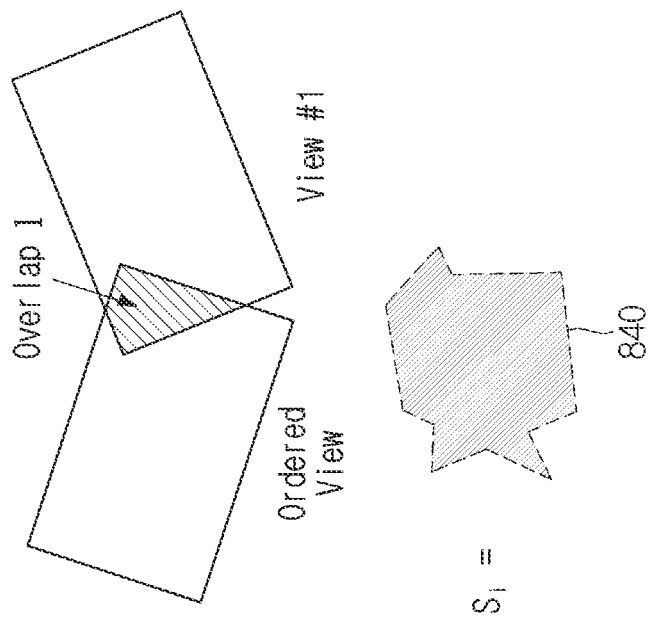
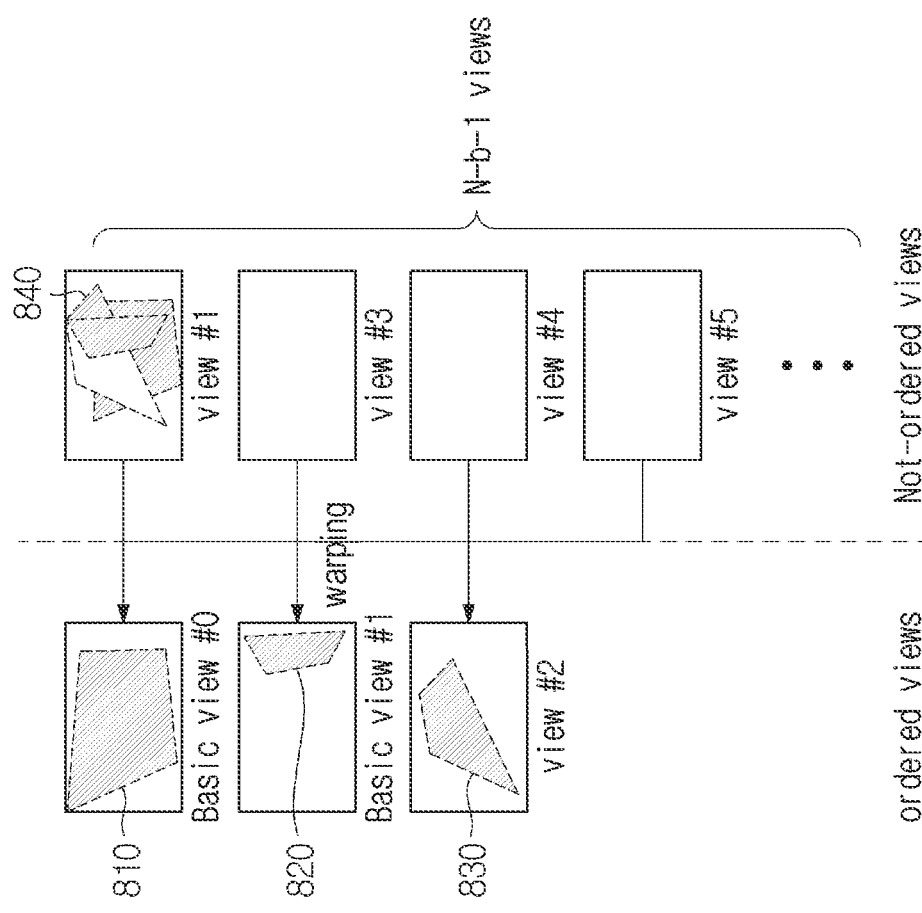

METHOD FOR PROCESSING IMMERSIVE VIDEO AND METHOD FOR PRODUCING IMMERSIVE VIDEO

CROSS REFERENCE TO RELATED APPLICATION

The present application claims priority to Korean Patent Application No. 10-2019-0081605, filed Jul. 5, 2019, No. 10-2019-0119176, filed Sep. 26, 2019, and No. 10-2020-0082200, filed Jul. 3, 2020, the entire contents of which are incorporated herein for all purposes by this reference.

BACKGROUND OF THE INVENTION

Field of the Invention

The present disclosure relates to a processing/synthesizing method for an immersive video supporting motion parallax for rotational and translation motions.

Description of the Related Art

Virtual reality service evolves towards maximizing senses of immersion and realism by generating an omni-directional video in realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) left-and-right rotation, (2) up-and-down rotation, (3) left-and-right translation, and (4) up-and-down translation. However, most omni-directional videos based on real images are currently supporting only rotational movements. Therefore, researches on such technical fields as the acquisition and reproduction of 6 DoF omni-directional videos are actively under way.

SUMMARY OF THE INVENTION

For providing a large-capacity immersive video service supporting motion parallax, the present disclosure is directed to provide a file format enabling video reproduction that supports motion parallax only by transmitting as small a video and as little metadata as possible.

Also, the present disclosure is directed to provide a method of removing duplicate data among additional view videos.

Also, the present disclosure is directed to provide a method of determining a priority order of pruning among additional view videos.

The technical objects of the present disclosure not limited to the above-mentioned technical objects, and other technical objects that are not mentioned will be clearly understood by those skilled in the art from the following description.

An immersive video processing method according to the present disclosure may include determining a priority order of pruning for source view videos, generating a residual video for an additional view video based on the priority order of pruning, packing a patch generated based on the residual video into an atlas video, and encoding the atlas video. Herein, the determining of the priority order of pruning may include determining a basic view video among the source view videos and determining a priority order of pruning for additional view videos except the basic view video.

In an immersive video processing method according to the present disclosure, the basic view video may have the highest priority of pruning.

In an immersive video processing method according to the present disclosure, the priority order of pruning among the additional view videos may be determined based on a size of an overlapping area with the basic view video.

In an immersive video processing method according to the present disclosure, when a pruning priority for at least one of the additional view videos is determined, pruning priorities for the remaining additional view videos may be determined based on a size of an overlapping area with each of higher-priority view videos, and the higher-priority view videos may include the basic view video and at least one additional view video with a pruning priority being determined.

In an immersive video processing method according to the present disclosure, pruning priorities for the remaining additional view videos may be determined based on a size of an area that is obtained by summing overlapping areas for each of the higher-priority view videos.

In an immersive video processing method according to the present disclosure, a priority order of pruning for the additional view videos may be determined based on whether the additional view videos include a region of interest.

The features briefly summarized above with respect to the present disclosure are merely exemplary aspects of the detailed description below of the present disclosure, and do not limit the scope of the present disclosure.

According to the present disclosure, a file format may be provided which enables video reproduction supporting motion parallax by transmitting as small a video and as little metadata as possible.

According to the present disclosure, an amount of data for immersive video processing may be reduced by removing duplicate data among additional view videos.

According to the present disclosure, immersive video processing efficiency may be improved by adaptively determining a priority order of pruning for additional view videos.

Effects obtained in the present disclosure are not limited to the above-mentioned effects, and other effects not mentioned above may be clearly understood by those skilled in the art from the following description.

BRIEF DESCRIPTION OF THE DRAWINGS

FIGS. 6A and 6B are views for explaining an exemplary embodiment for determining pruning priorities of candidate view videos.

FIG. 7 is a view for explaining an exemplary embodiment for determining pruning priorities of candidate view videos.

FIG. 8 is a view for explaining an exemplary embodiment for determining pruning priorities of candidate view videos.

DETAILED DESCRIPTION OF THE INVENTION

Figure 1:
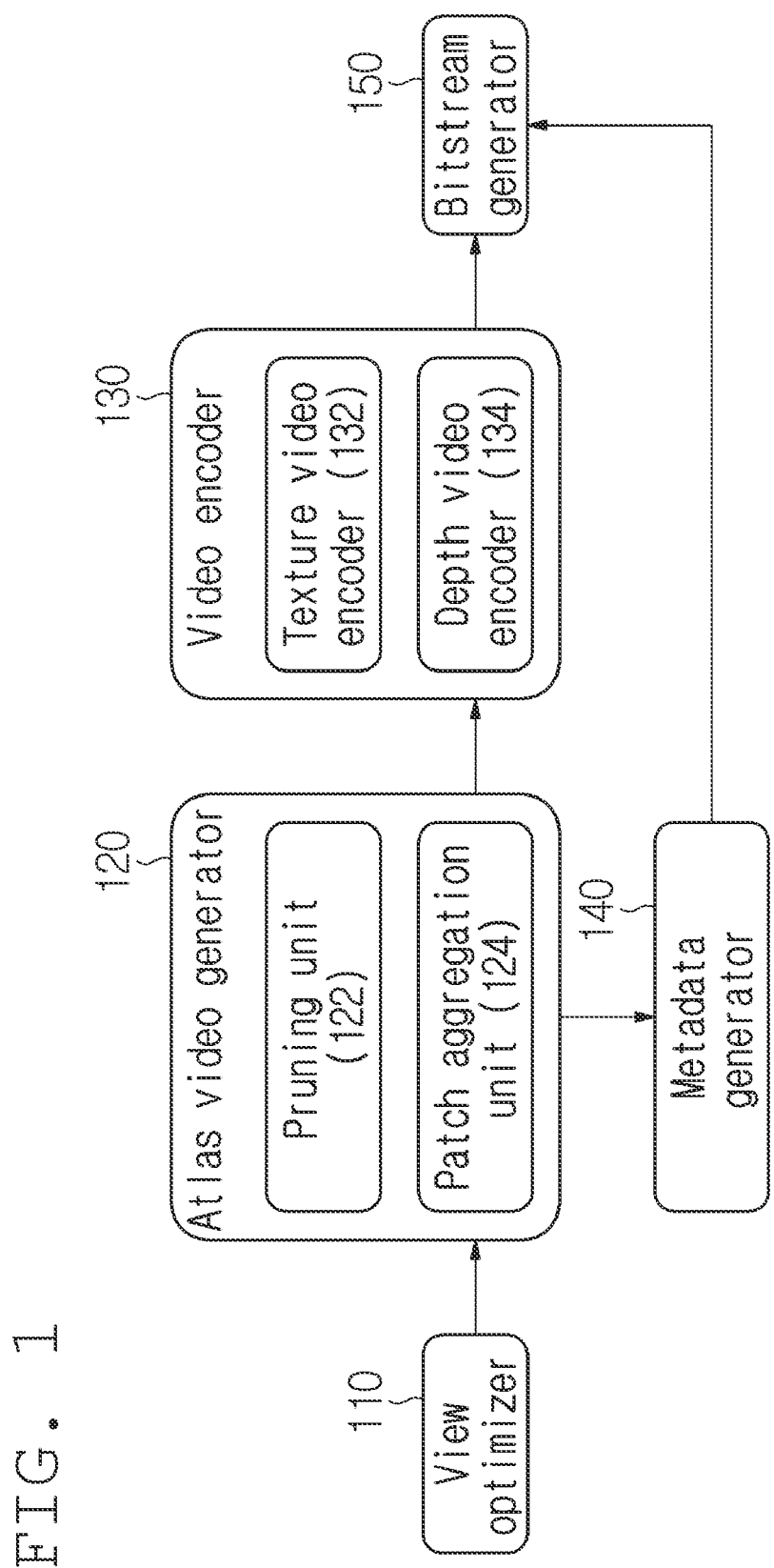
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments may be construed as including all modifications, equivalents, or substitutes in a technical concept and a technical scope of the present disclosure. In the drawings, similar reference numerals refer to same or similar functions in various aspects. In the drawings, the shapes and dimensions of elements may be exaggerated for clarity. In the following detailed description of the present disclosure, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific shapes, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', and the like may be used to describe various components, but the components are not to be construed as being limited to the terms. The terms are used only to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present description, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element therebetween.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, and are not intended to limit the present disclosure. Singular expressions encompass plural expressions unless the context clearly indicates otherwise. In the present disclosure, it is to be understood that terms such as "include", "have", etc. are intended to indicate the existence of the features, numbers, steps, actions, elements, parts, or combinations thereof disclosed in the specification but are not intended to preclude the possibility of the presence or addition of one or more other features, numbers, steps, actions, elements, parts, or combinations thereof. In other words, when a specific element is referred to as being "included", other elements than the corresponding element are not excluded, but additional elements may be included in the embodiments of the present disclosure or the technical scope of the present disclosure.

In addition, some of components may not be indispensable ones performing essential functions of the present disclosure but may be selective ones only for improving performance. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present specification. Identical constituent elements in the drawings are denoted by identical reference numerals, and a repeated description of identical elements will be omitted.

An immersive video means a video that enables a viewport to dynamically change when a viewing position of a user changes. Immersive videos may be classified into such types as 3DoF (Degree of Freedom), 3DoF+, Windowed-6DoF and 6DoF.

A 3DoF video means a video that represents a movement of a viewport by three rotational movements (for example, yaw, roll and pitch). A 3DoF+ video means a video that adds limited translation movements to a 3DoF video. A 6DoF video means a video that represents a movement of a viewport by three rotational movements and three translation movements (for example, (x, y, z) vector).

3DoF+ videos and 6DoF videos may provide a user with motion parallax not only for a rotational movement but also limited or various translation movements (for example, left-right/up-down/forward-backward).

A 3DoF+ or 6DoF immersive video providing a user with motion parallax may include texture information and depth information. On the other hand, a 3DoF immersive video that does not provide motion parallax may consist of only texture information.

In the embodiments described below, an immersive video is assumed to be of a type capable of providing motion parallax like 3DoF+, Windowed-6DoF or 6DoF videos. However, the embodiments described below may also be applicable to 3DoF or similar immersive videos based on texture information. When the embodiments described below are applied to an immersive video based on texture information, the processing and representation of depth information may be omitted.

In the present disclosure, 'view' indicates a capturing position of a camera, a viewing position of a viewer, or any other position for generating/appreciating an immersive video. 'View video' refers to a video covering a field of vision/view angle of a particular view. For example, a view video may refer to a video captured in a particular view, a video synthesized around a particular view, or a video covering a region seen from a particular view.

A view video may include a texture video and a depth video. A view video may be referred to in various ways according to type or usage. For example, a video captured by a camera located in a particular view or a view video having the best quality in a particular view may be referred to as a 'source view video'. In the embodiments described below, according to types or purposes of view videos, such expressions like 'source', 'additional', 'reference' and 'base' may be added in front of 'view video'.

View videos with different views will be distinguished by prefixing such expressions as 'first' and 'second'.

Hereinafter, the present disclosure will be described in detail.

Multi-view videos are required to realize an immersive video. Also, in order to realize a 3DoF+ or 6DoF-based immersive video, not only monoscopic data (for example, texture videos) but also stereoscopic data (for example, depth videos and/or camera information) are required.

As an immersive video is realized based on multi-view video data, an efficient storage and compression technique for large video data is required to obtain, generate, transmit and reproduce an immersive video.

The present disclosure provides an immersive video generation format and compression technique capable of storing and compressing a 3DoF+ or 6DoF immersive video that supports motion parallax, while maintaining compatibility with a 3DoF-based immersive video.

FIG. 1 is a block diagram of an immersive video processing apparatus according to an embodiment of the present disclosure.

Referring to FIG. 1, an immersive video processing apparatus according to the present disclosure may include a view optimizer 110, an atlas video generator 120, a metadata generator 130, a video encoder 140 and a bit stream generator 150.

In a windowed-6DoF video based on a monoscopic video, each source view video may be a 2D video. On the other hands, in a 3DoF+ or 6DoF video based on an omnidirectional video, each source view video may be a 3D or 3DoF video including a texture video and a depth video.

The view optimizer 110 classifies a plurality of source view videos into basic view videos and additional view videos. An additional view video is referred to as a source view video that is not selected as a basic view video.

More particularly, the view optimizer 110 may select at least one of a plurality of source view videos as a basic view video. For example, the view optimizer 110 may select a source view video having the view in a central position as a base view video among source view videos.

Alternatively, the view optimizer 110 may determine a basic view video on the basis of a camera parameter. More particularly, the view optimizer 110 may determine a basic view video on the basis of a video index, an order of priority among cameras, a camera position or whether or not a camera is a ROI (Region of Interest) camera.

For example, the view optimizer 110 may determine a source view video with a smallest (or largest) video index, a source view video with a predefined index, a source view video captured through a camera with a highest (lowest) priority, a source view video captured through a camera in a specific position (for example, a central position), or a source view video captured through a ROI camera, as a basic view video. A video index may be set to be identical with a camera index.

Alternatively, the view optimizer 110 may select a basic view video on the basis of the qualities of source view videos. For example, the view optimizer 110 may select a source view video with the best quality among source view videos as a basic view video.

Alternatively, the view optimizer 110 may examine a degree of duplication among source view videos and select a basic view video on the basis of the descending (or ascending) order of duplicate data with other source view videos.

Alternatively, the view optimizer 110 may select a basic view video on the basis of data (for example, metadata) input from outside. Data input from outside may include at least one among an index specifying at least one of a plurality of cameras, an index specifying at least one of a plurality of capturing views, and an index specifying at least one of a plurality of source view videos.

A plurality of source view videos may be selected as basic view videos.

The atlas video generator 120 may generate residual data of an additional view video by subtracting a basic view video from the additional view video and then generate an atlas video based on the residual data.

Pruning may be referred to as removing an overlapping area with a basic view video, that is, a pixel present in the basic view video from an additional view video.

The atlas video generator 120 may include a pruning unit 122 and a patch aggregation unit 124.

The pruning unit 122 performs pruning for an additional view video. Pruning may be intended to remove duplicate data with a basic view video from an additional view video.

As a result of pruning, residual data for an additional view video may be generated.

Source view videos generated by capturing a same object in different views may have duplicate data. Accordingly, when a basic view video is subtracted from an additional view video, data that are not included in the basic view video may be generated as residual data for the additional view video.

After an additional view video is warped into the position of a basic view video, duplicate data may be determined by comparing a pixel value between the basic view video and a warped video. Herein, a pixel used for determining duplicate data may be a texture component or a depth component.

For example, duplicate data may be determined by considering Formula 1 below.

$$|z-z\_p|<\text{RedundancyFactor}\times\min(z,z\_p) \quad \text{Formula 1}$$

In Formula 1, z represents a depth value of a comparison target position (for example, a position of pixel within a basic view video). z_p represents a depth value of a removal target position (for example, a position of pixel within a warped video). The variable Redundancy factor indicates a correction value of determination range for duplicate data. When an absolute value of difference between z and z_p is less than the variable Redundancy Factor, it may be determined that data of a removal target position are duplicate with data of a comparison target position.

A threshold for determining duplicate data (for example, the variable Redundancy Factor) may be determined based on at least one of a bit depth, a color format, and a video size. Alternatively, a default value that is already stored in an immersive video processing apparatus may be set as a threshold.

When there is a plurality of basic view videos, residual data for an additional view video may be generated by subtracting each of the plurality of basic view videos from the additional view video. Alternatively, residual data for an additional view video may be generated by selecting at least one of a plurality of basic view videos and subtracting the selected basic view video from the additional view video.

When residual data are generated by removing duplicate data between an additional view video and a basic view video, there still remains a problem that duplicate data among additional view videos are not removed.

In order to remove duplicate data among additional view videos, additional pruning may be performed for at least some of the additional videos by using other additional view video. Thus, residual data of an additional view video may be generated by removing duplicate data with a basic view video and duplicate data with another additional view video.

Hereinafter, source view videos used for pruning of an additional view video will be referred to as reference view videos. For example, depending on a pruning priority of an additional view video, a reference view video may include only a basic view video or both the basic view video and another additional view video.

Figure 2:
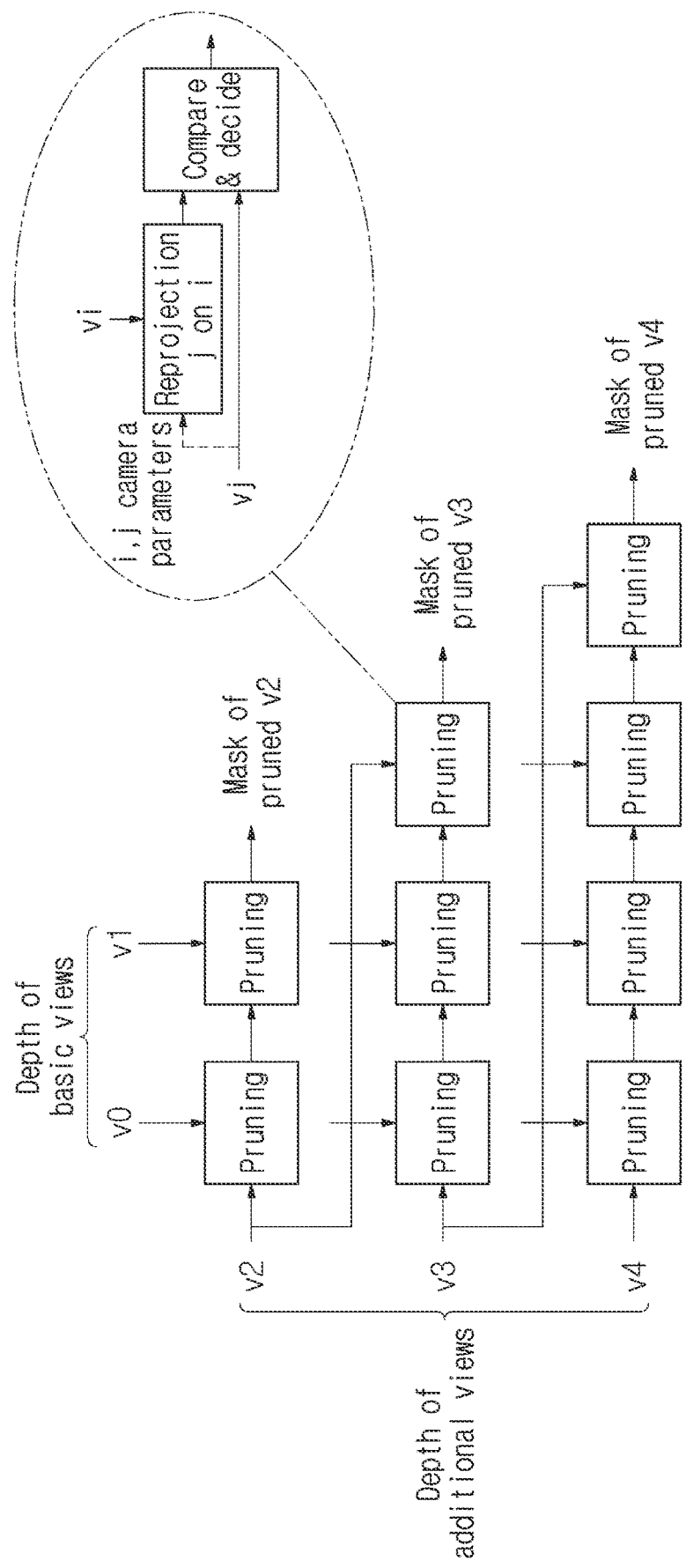
FIG. 2 shows a priority order of pruning among source view videos.

FIG. 2 shows a priority order of pruning among source view videos.

Pruning for an additional view video with a low priority may be performed by using a source view video with a high priority as a reference view video.

A basic view video is a source view video with the highest priority of pruning.

When a first additional view video has the highest priority of pruning among additional view videos (for example, v2 of FIG. 2), pruning of the first additional view video may be performed by using only a basic view video.

On the other hand, when there is at least one additional view video having a higher priority of pruning than a second additional view video, a basic view video and the additional view video having a higher priority of pruning than the second additional view video may be set as reference view videos for the second additional view video. For example, as illustrated in FIG. 2, pruning for the additional view video v3 may be performed by setting the basic view video v0, the basic view video v1 and the additional view video v2 as reference view videos. Pruning for the additional view video v4 may be performed by setting the basic view video v0, the basic view video v1, the additional view video v2 and the additional view video v3 as reference view videos.

In short, pruning of an additional view video may be performed through pruning with a basic view video and then additional pruning with another additional view video according to a priority order of pruning.

Pruning with a basic view video does not require dependence among additional view videos. Accordingly, pruning between a basic view video and additional view videos may be performed in parallel. In other words, pruning of the additional view videos v2, v3 and v4 respectively for a basic view video may be performed in parallel.

On the other hand, pruning between additional view videos needs to be performed in a priority order of pruning among additional view videos.

A priority order of pruning among additional view videos may be determined based on a video index or a camera index. For example, a priority order of pruning may be determined in an ascending or descending order of video indexes or camera indexes.

Alternatively, a priority order of pruning among additional view videos may be determined by considering an amount of duplicate data with a basic view video. For example, a priority order of pruning among additional view videos may be determined in a descending or ascending order of duplicate data with a basic view video.

As a result of pruning, a residual video may be generated with duplicate data with a reference view video being removed. A residual video may be a mask video that discriminates between a non-empty region and an empty region. A residual video may be input into the patch aggregation unit 124, and the patch aggregation unit 124 may cluster residual data in an intraperiod unit.

Figure 3:
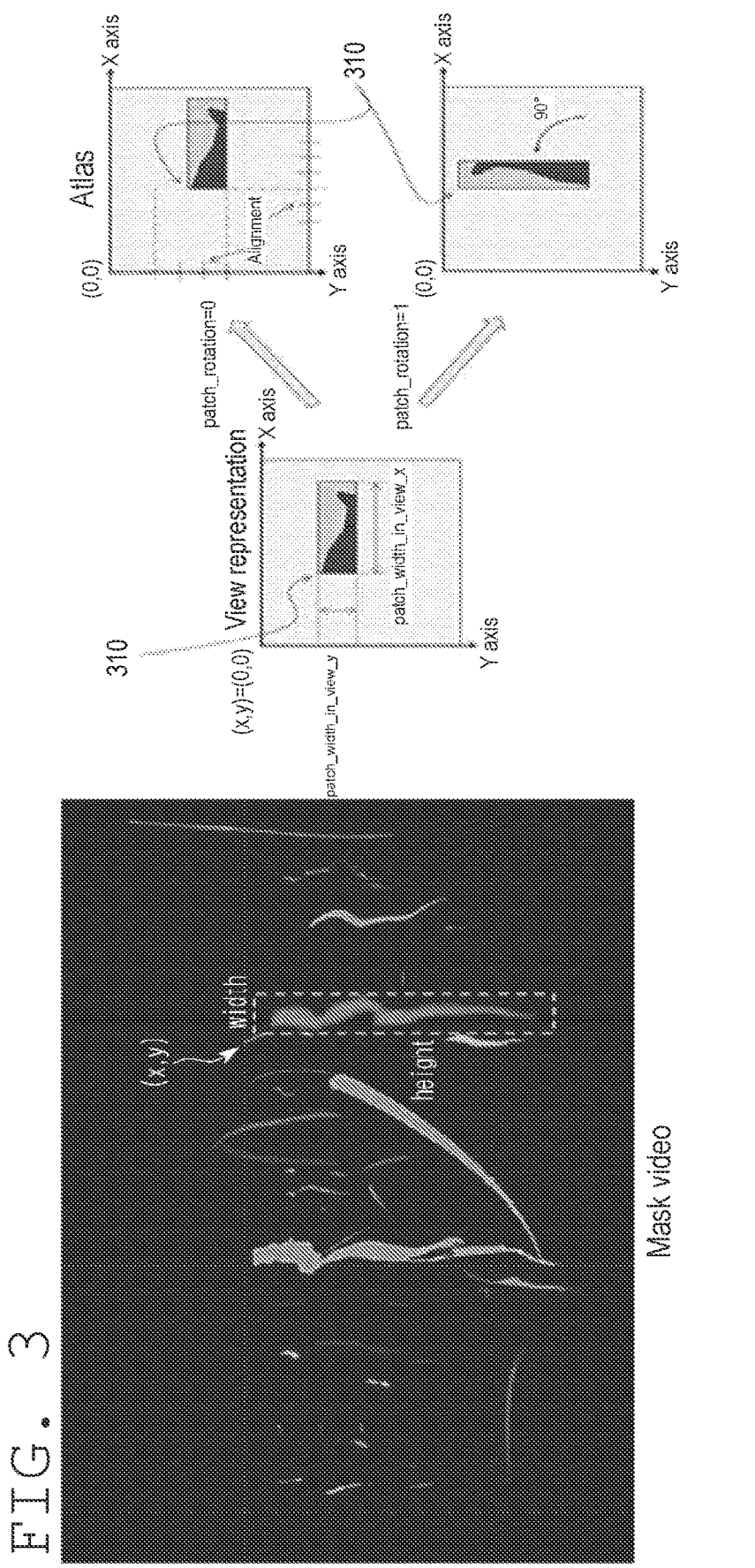
FIG. 3 is a view for explaining a clustering and packing process for residual data.

FIG. 3 is a view for explaining a clustering and packing process for residual data.

As a result of pruning, a mask video discriminating between an empty region and a non-empty region within an additional view video may be generated. An empty region represents a region where duplicate data with a reference view video are distributed, and a non-empty region represents a region where non-duplicate data with respect to an additional view video are distributed.

For compatibility with the conventional 2D encoder/decoder, a preprocessing process may be applied for processing a residual video into a rectangular video.

During a preprocessing process, through a clustering process, a rectangular patch (310) may be generated. A patch indicates a rectangular region including data of a non-empty region. A patch may be referred to as a mask region.

When data of a non-rectangular non-empty region is processed into a rectangular patch, the patch may include not only data of the non-empty region but also some data of an empty region.

Each patch may be packed into a rectangular video. Packing may be accompanied by conversion of patch size and transforms like rotation and flip. A video where patches are packed may be referred to as an atlas video.

Based on mask information of each patch, texture data and/or depth data may be extracted. Herein, mask information may be intended to discriminate between data of a non-empty region and data of an empty region within a patch.

An atlas video may be generated by putting texture data and/or depth data thus extracted on a patch within an atlas video.

Separate atlas videos may be generated for a texture video and a depth video respectively.

The metadata generator 130 generates metadata for view video synthesis. More particularly, the metadata generator 130 may format residual video-related additional information that is packed into an atlas.

Metadata may include various information for view video synthesis.

For example, metadata may include basic view video information. Basic view video information may include at least one of information for specifying a source view video selected as a basic view video and information indicating the number of basic view videos.

Metadata may include information on a priority order of pruning. Information on a priority order of pruning may include information indicating whether or not a source view video is a leaf node. When there is no additional view video using the source view video as a reference view video, it may be determined that the source view video is a leaf node.

When the source view video is not a leaf node, information on a child node of the source view video may be additionally encoded. Herein, a child node may mean an additional view video that is one level below the source view video in a priority order of pruning.

Information on a child node may include at least one of information on the number of source view videos using the source view video as a reference view video and information for specifying source view videos using the source view video as a reference view video.

Alternatively, information on a priority order of pruning may be configured so that information indicating whether or not a source view video is a root node is included. A root node represents a source view video without parent node. Thus, a root node may be a basic view video for which pruning is not performed.

When a source view video is not a root node, information on a parent node of the source view video may be additionally encoded. Herein, a parent node may mean an additional view video that is one level above the source view video in a priority order of pruning or a basic view corresponding to a root view.

Information on a parent node may include at least one of information on the number of higher-priority view videos that are used as reference view videos by the source view video and information for specifying a source view videos that the source view video uses as a reference view video.

The video encoder 140 encodes a basic view video and an atlas video. The video encoder may include a texture video encoder 142 for a texture video and a depth video encoder 144 for a depth video.

A bitstream generator 150 generates a bitstream on the basis of an encoded video and metadata. A bitstream thus generated may be transmitted to an immersive video output apparatus.

Figure 4:
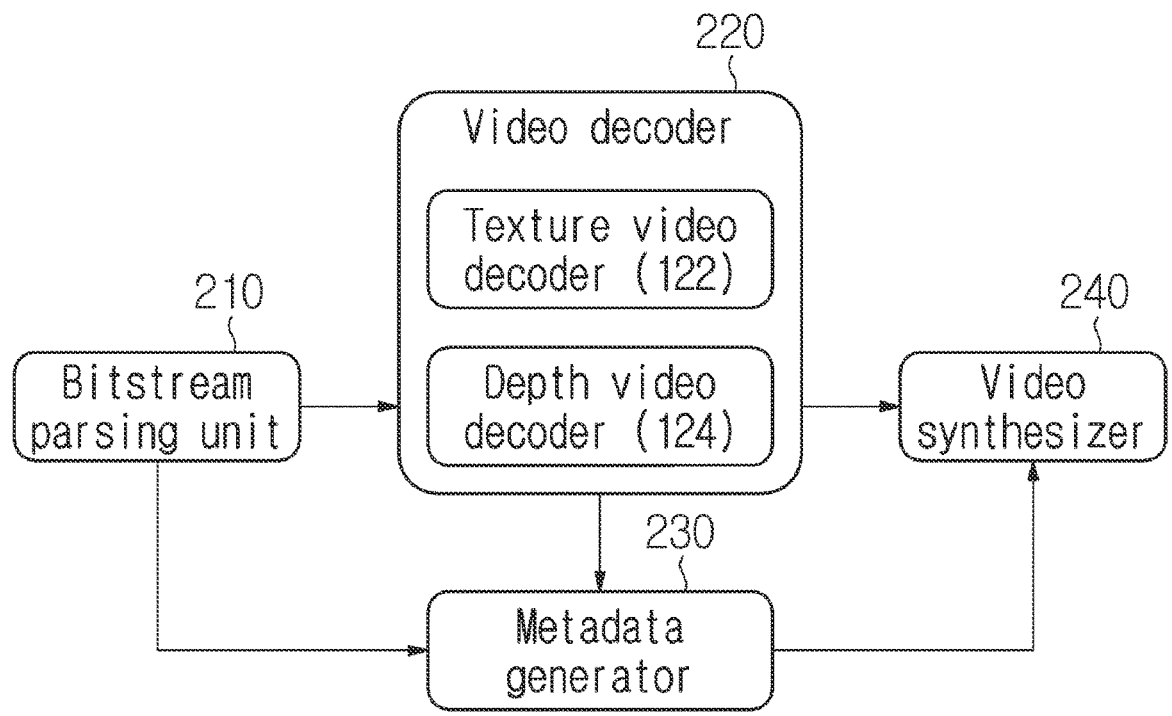
FIG. 4 is a block diagram of an immersive video output apparatus according to the present disclosure.

FIG. 4 is a block diagram of an immersive video output apparatus according to the present disclosure.

Referring to FIG. 4, an immersive video output apparatus according to the present disclosure may include a bitstream parsing unit 210, a video decoder 220, a metadata processor 230, and a video synthesizer 240.

A bitstream parsing unit parses video data and metadata from a bitstream. Video data may include data of an encoded basic view video and data of an encoded atlas video.

The video decoder 220 decodes parsed video data. The video decoder 220 may include a texture video decoder 222 for decoding a texture video and a depth video decoder 224 for decoding a depth video.

The metadata processor 230 unformats parsed metadata.

Unformatted metadata may be used to synthesize a view video. For example, in order to synthesize a viewport video corresponding to a viewing position of a user, the metadata processor 230 may determine the position/size of necessary patches for viewport video synthesis in an atlas video by using metadata.

The video synthesizer 240 may dynamically synthesize a viewport video corresponding to a viewing position of a user. For viewport video synthesis, the video synthesizer 240 may extract necessary patches for synthesizing a viewport video from an atlas video. More particularly, based on metadata that are unformatted in the metadata processor 230, an index of a source view video corresponding to a viewing position of a user, information on the position/size of each patch within an atlas video, or a camera parameter may be extracted.

When a source view video corresponding to a viewing position of a user is determined, patches extracted from source view videos corresponding to the determined source view video among patches included in an atlas video and positions/sizes of the patches may be determined.

Then, a patch corresponding to a position/size thus determined may be filtered and separated from an atlas video. When patches necessary for synthesizing a viewport video are extracted, the viewport video may be generated by synthesizing a basic view videos and the patches.

More particularly, after warping and/or transforming a basic view video and patches into a coordinate system of a viewport, a viewport video may be generated by merging the warped and/or transformed basic view video and the warped and/or transformed patches.

Based on the above description, a video processing method proposed by the present disclosure will be described in further detail.

According to a priority order of pruning among additional view videos, the size and/or quality of residual data may be different.

FIGS. 5A to 5D illustrate an example of generating different residual data according to a priority order of pruning among additional view videos.

In the examples shown in FIGS. 5A to 5D, it is assumed that View1 is a basic view video, and View2 and View3 are additional view videos.

Figure 5A:
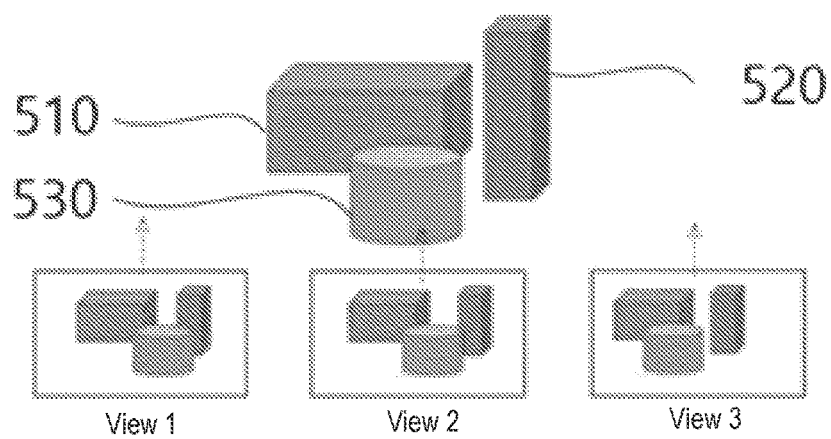
FIGS. 5A to 5D illustrate examples of generating different residual data according to a priority order of pruning among additional view videos.

FIG. 5A illustrates each source view video.

Figure 5B:
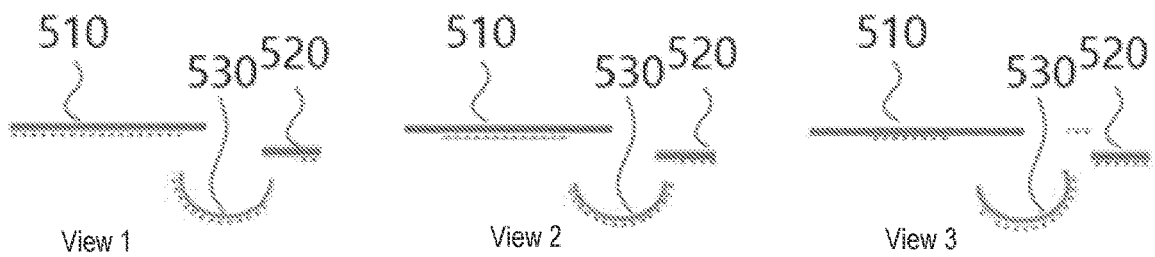

In FIG. 5B, the thick solid line represents an outline of a subject, and the thin solid line represents a part of the outline of the subject that is included in a source view video. Also, in FIGS. 5C and D, the broken line for an additional view video represents residual data that are obtained as a result of pruning.

Figure 5C:
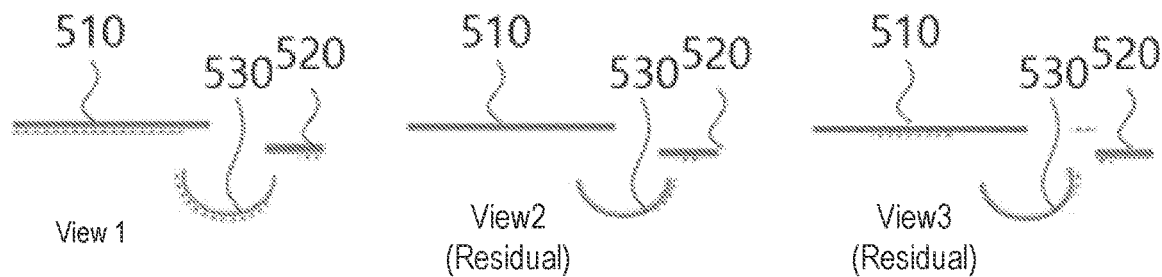

FIG. 5C shows an example where the first additional view video View2 has a higher pruning priority than the second additional view video View3.

A residual video of the first additional view video View2 may be generated by removing duplicate data with the basic view video View1. For example, as in the example illustrated in FIG. 5C, a residual video for the first additional view video View2 may be generated by removing a part commonly shown in the basic view video View1 and the first additional view video View2 and including a region that is present only in the first additional view video View2.

A residual video of the second additional view video View3 may be generated by removing duplicate data with the basic view video View1 and the first additional view video View2. For example, as in the example illustrated in FIG. 5C, a residual video for the second additional view video View3 may be generated by removing a part commonly shown in the basic view video View1 and the second additional view video View3 and a part commonly shown in the first additional view video View2 and the second additional view video View3. Thus, a residual video for the second additional view video View3 may be generated by including a part that is present only in the second additional view video View3.

Figure 5D:
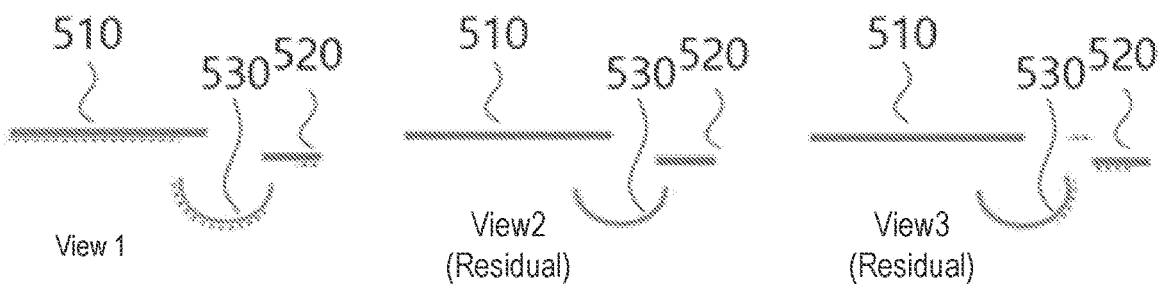

FIG. 5D shows an example where the second additional view video View3 has a higher pruning priority than the first additional view video View2.

A residual video of the second additional view video View3 may be generated by removing duplicate data with the basic view video View1. For example, as in the example illustrated in FIG. 5D, a residual video for the second additional view video View3 may be generated by removing a part commonly shown in the basic view video View1 and the second additional view video View3 and including a region that is present only in the second additional view video View3.

A residual video of the first additional view video View2 may be generated by removing duplicate data with the basic view video View1 and the second additional view video View3. For example, as in the example illustrated in FIG. 5D, a residual video for the first additional view video View2 may be generated by removing a part commonly shown in the basic view video View1 and the first additional view video View2 and a part commonly shown in the first additional view video View2 and the second additional view video View3. Thus, a residual video for the second additional view video View3 may be generated by including a part that is present only in the second additional view video View3.

In an example illustrated in FIGS. 5A to 5D, a part that is not seen in the basic view video View1 but seen in the second additional view video View3 includes a part that is not seen in the basic view video View1 but seen in the first additional view video View2. Accordingly, residual data for a first additional view video has a smaller size when a priority order of pruning is set as in the example of FIG. 5D than when a priority order of pruning is set as in the example of FIG. 5C.

In other words, according to a priority order of pruning among source view videos, a fragmentation degree of pixels constituting a single object is determined. In the example illustrated in FIG. 5C, data for the cylindrical object 530 are dispersedly stored in a residual video of the first additional view video View2 and a residual video of the second additional view video View3. On the other hand, in the example illustrated in FIG. 5D, data for the cylindrical object 530 are stored only in a residual video of the second additional view video View3 but not in a residual video of the first additional view video View2.

Video synthesis quality may be improved when data for a single object are distributed in a small number of residual videos rather than in a plurality of residual videos. When data for a single object are distributed in a plurality of residual videos, quality may be lowered in a view blending process for video synthesis. Accordingly, a priority order of pruning among source view videos needs to be determined so that pixels with high similarity (for example, pixels included in a same region or pixels constituting a same object) are capable of being clustered.

Hereinafter, a method of determining a priority order of pruning, as propose in the present disclosure, will be described in detail.

According to an embodiment of the present disclosure, a pruning priority of an additional view video may be determined based on a size of a region overlapping with a view video for which a pruning priority has been already determined. More particularly, a pruning priority may be determined based on a ratio between a size of an additional view video and the number of pixels overlapping with a view video for which a pruning priority has already been determined within the additional view video.

For the convenience of description, a view video for which a pruning priority has not been determined yet will be referred to as a candidate view video or a not-ordered video. In addition, a view video for which a pruning priority is determined will be referred to as a higher-priority video or an ordered video.

An additional view video having a small overlapping region with a basic view video may be assumed to include relatively more data that are not seen in the basic view video. Accordingly, among additional view videos, the highest pruning priority may be given to an additional view video having a small overlapping region with a basic view video.

When there is a plurality of basic view videos, an overlapping region between an additional view video and each basic view video may be calculated. After overlapping regions with each basic view video are added up, a pruning priority may be determined based on a percentage of the added-up region in an additional view video.

The pruning priorities of the remaining additional view videos may be determined by considering an overlapping region with reference view videos for which pruning priorities are already determined.

Figure 6B:
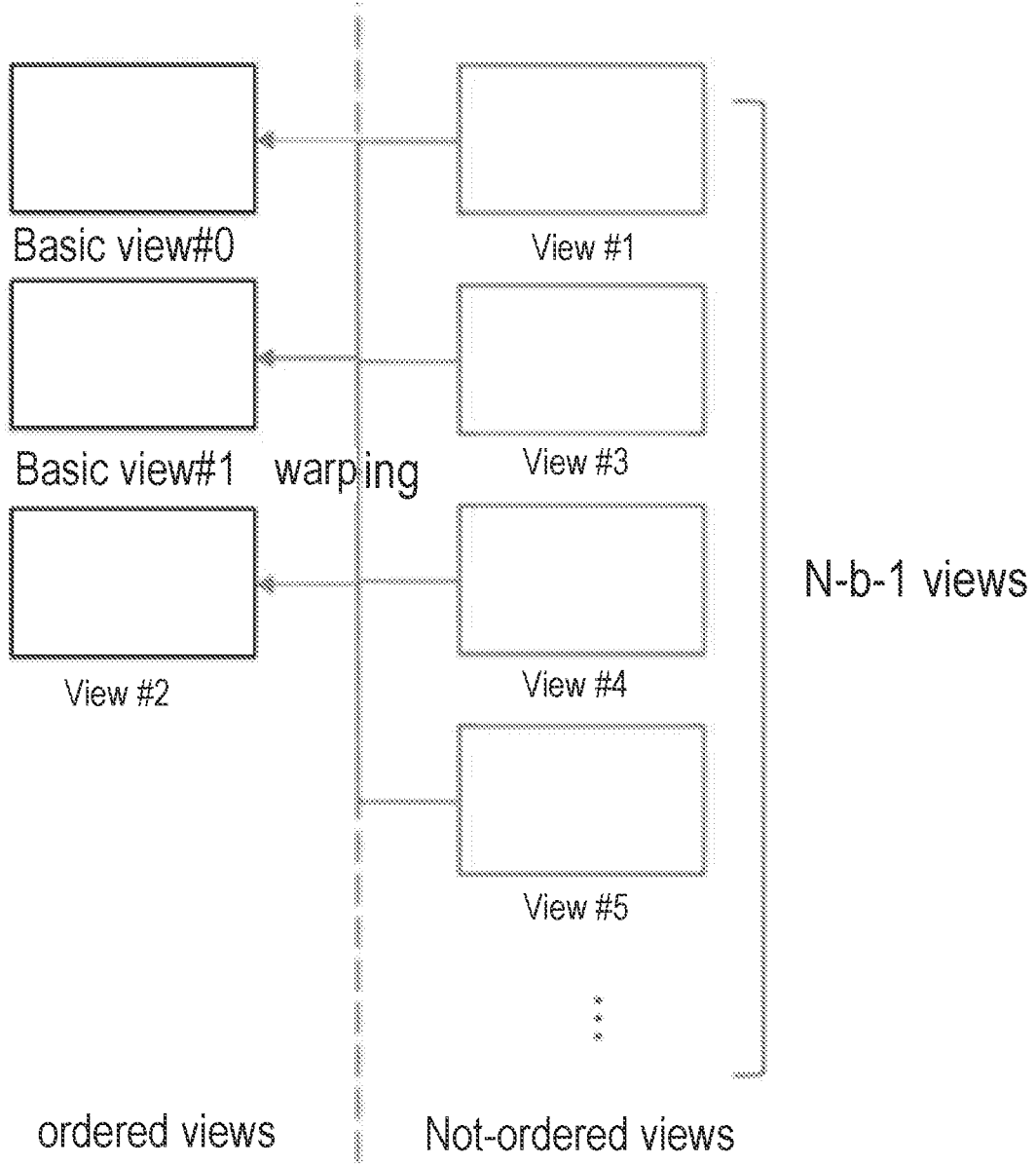

FIGS. 6A and 6B are a view for explaining an exemplary embodiment for determining pruning priorities of candidate view videos.

In FIGS. 6A and 6B, 'Ordered Views' represent higher-priority videos for which pruning priorities are determined, and 'Not-ordered Views' represent candidate view videos for which pruning priorities are not determined.

Among additional view videos, the highest pruning priority may be given to an additional view video having the lowest ratio of a region overlapping with a basic view video. In this way, an additional view region for which a pruning priority is determined may be moved from the region 'Not-ordered Views' to the region 'Ordered Views' (refer to FIGS. 6A and 6B). For the remaining additional view videos (that is, view videos belonging to the region 'Not-ordered Views'), pruning priorities may be determined by calculating ratios of overlapping regions with higher-priority videos (that is, view videos belonging to the region 'Ordered Views').

In other words, until the pruning priorities of all the not-ordered candidate view videos have been determined, ratios of overlapping regions between view videos belonging to the region 'Ordered Views' and view videos belonging to the region 'Not-Ordered Views' may be iteratively calculated. For example, when the number of source view videos is N and the number of basic view videos is b, ratios of overlapping regions between view videos belonging to the region 'Ordered Views' and view videos belonging to the region 'Not-Ordered Views' may be iteratively calculated (N−b−1) times.

FIG. 7 is a view for explaining an exemplary embodiment for determining pruning priorities of candidate view videos.

In FIG. 7, the regions 710, 720, 730 outlined with broken lines represent overlapping regions between the candidate view video 1 (View 1) and each higher-priority view video.

A candidate view video may be 3D warped to a coordinate system of a higher-priority video by using depth information of the candidate view video. As a result of 3D warping, an overlapping region between a candidate view video and a higher-priority video may be calculated in a two-dimensional (x-y) coordinate system.

When there is a plurality of higher-priority videos, an overlapping region may be calculated between a candidate view video and each of the higher-priority videos. For example, when there are three higher-priority videos, overlapping regions between a candidate view video and each of the three higher-priority videos may be calculated.

Then, the overlapping regions with each of the higher-priority videos may be added up. In the example illustrated in FIG. 7, for the candidate view video 1 (View 1), an overlapping region 710 between the candidate view video 1 (View 1) and the first higher-priority video (Basic View 0), an overlapping region 720 between the candidate view video 1 (View 1) and the second higher-priority video (Basic View 1), and an overlapping region between the candidate view video 1 (View 1) and the third higher-priority video (View 2) may be simply added up.

Then, a priority order among candidate view videos may be determined based on an area of an added region of each candidate view video. More particularly, among candidate view videos, a highest pruning priority may be given to a candidate view video with the smallest area of added region.

FIG. 8 is a view for explaining an exemplary embodiment for determining pruning priorities of candidate view videos.

In FIG. 8, the regions 810, 820, 830 outlined with broken lines in the region 'Ordered View' represent overlapping regions between the candidate view video 1 (View 1) and each higher-priority view video. In addition, the region 840 outlined with broken lines in the region 'Not-Ordered View' represents the position of the overlapping regions in the candidate view video 1.

When determining an overlapping region between a candidate view video and a higher-priority video, depth information between the candidate view video and the higher-priority video may be used. For example, a pixel of which the difference of depth value from a higher-priority video within a candidate view video is equal to or less than a threshold may be determined as duplicate data with the higher-priority video.

For example, in FIG. 8, $z\_i$ represents a depth value in a candidate view video, and $z$ represents a depth value in a higher-priority video. The variable Redundancy Factor indicates a correction value of duplicate data determination.

When an absolute value of difference between a depth value in a candidate view video and a depth value in a higher-priority video is less than a threshold, a pixel in the candidate view video may be determined as duplicate data with the higher-priority video.

When there is a plurality of higher-priority videos, an overlapping region may be calculated between a candidate view video and each of the higher-priority videos. Then, overlapping regions for each of the higher-priority videos may be added up.

Herein, when calculating an area of an added region, a pixel at a same position may be set so as not to be cumulatively calculated. In other words, an area of an added region may be calculated through union set operation. For example, when a single pixel is duplicate with a plurality of higher-priority videos, the pixel may be set to be considered only one time in calculating an area of an added region.

A priority order among candidate view videos may be determined based on an area of an added region. More particularly, among candidate view videos, a highest pruning priority may be given to a candidate view video with the smallest area of added region.

Figure 9:
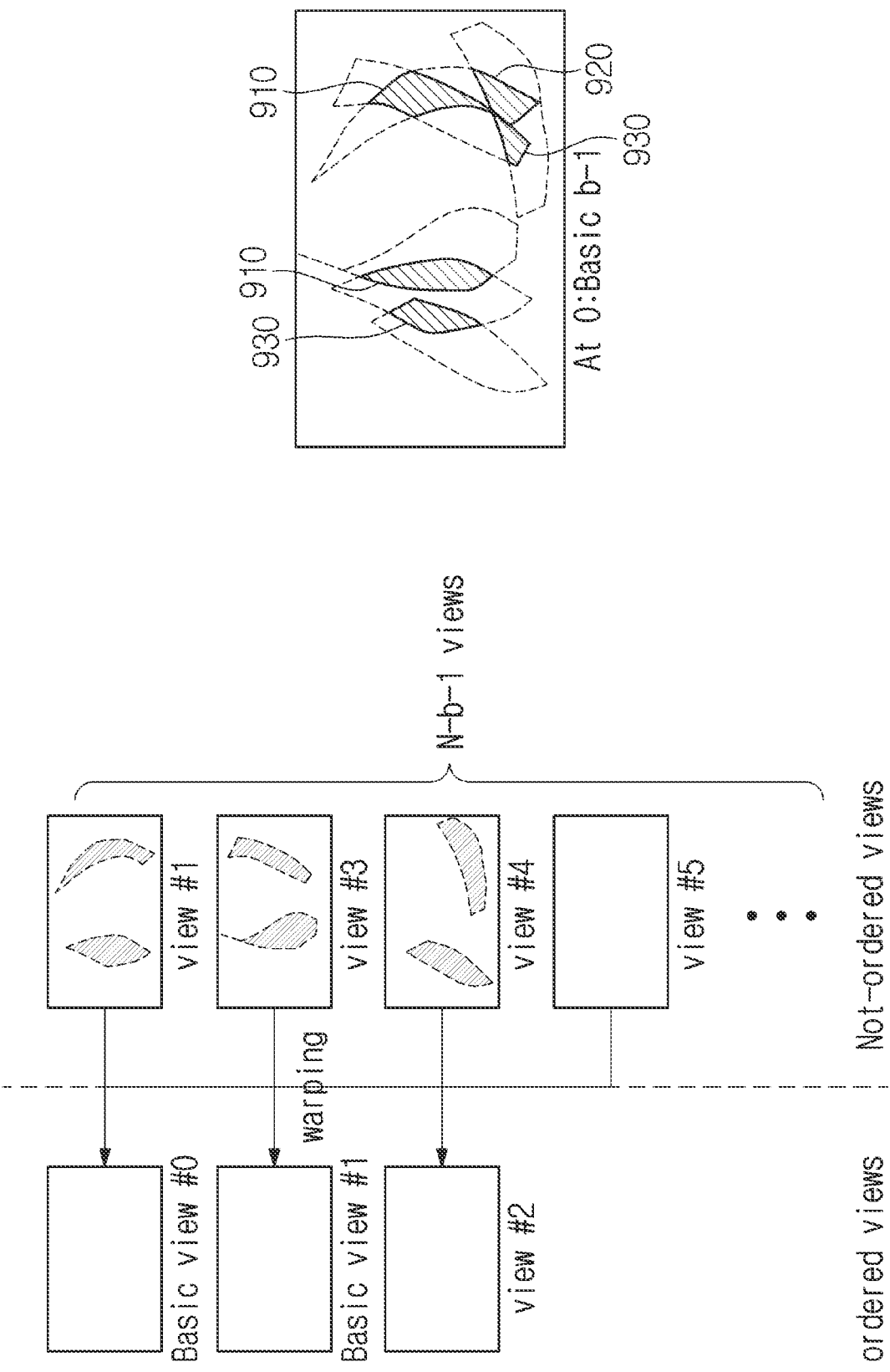
FIG. 9 is a view for explaining an exemplary embodiment for determining pruning priorities of candidate view videos.

FIG. 9 is a view for explaining an exemplary embodiment for determining pruning priorities of candidate view videos.

On the basis of a higher-priority video, candidate view videos may be pruned, and pruning priorities of candidate view videos may be determined by using pruned candidate view videos.

Herein, pruning of candidate view videos may be performed by using only a basic view video. In the example illustrated in FIG. 9, pruning for candidate view videos may be performed by a first basic view video (Basic view 0).

Alternatively, pruning for candidate view videos may be performed by using a plurality of higher-priority view videos or a plurality of basic view videos.

As a result of pruning, residual videos of each candidate view video may be generated. A residual video may include data that are not duplicate with a higher-priority video (that is, data that are not seen in a higher-priority video). In FIG. 9, the broken line contour shown in the region 'Ordered View' represents residual data for each candidate view video.

A residual video of each candidate view video may be 3D warped to a same coordinate system. For example, a residual video of candidate view videos may be 3D warped to a coordinate system of the basic view video 0.

Herein, pixels of a plurality of residual videos may be repeatedly mapped to a single pixel in a higher-priority video. This indicates duplicate data among residual videos.

For example, when residual videos of the first candidate view video (View 1), the second candidate view video (View 3) and the third candidate view video (View 4) are warped to a same coordinate system, the overlapping region 910 between the first candidate view video and the second candidate view video, the overlapping region 920 between the first candidate view video and the third candidate view video, and the overlapping region 930 between the second candidate view video and the third candidate view video may be detected.

When an overlapping region between candidate view videos is large, it may be understood that a corresponding candidate view video includes much data that are not seen in a higher-priority video. Accordingly, on the basis of the size or number of overlapping regions between candidate view videos, a priority order of pruning among candidate view videos may be determined. For example, on the basis of the size or number of regions within a candidate view video to which data of candidate view videos are repeatedly mapped two or more times, the pruning priority of the corresponding candidate view video may be determined.

The above-described method of determining pruning priority may be repeatedly performed until the pruning priorities of all candidate view videos have been determined.

When there are many view videos, considering all the region in a video for ideal clustering causes a significant increase of image processing complexity. Accordingly, in order to improve an image synthesis quality in an arbitrary view adjacent to a region of interest, it is worthy of considering a method of setting a region of interest and determining pruning priority by using the region of interest. Hereinafter, a method of determining pruning priority on the basis of a region of interest will be described in detail.

Figure 10:
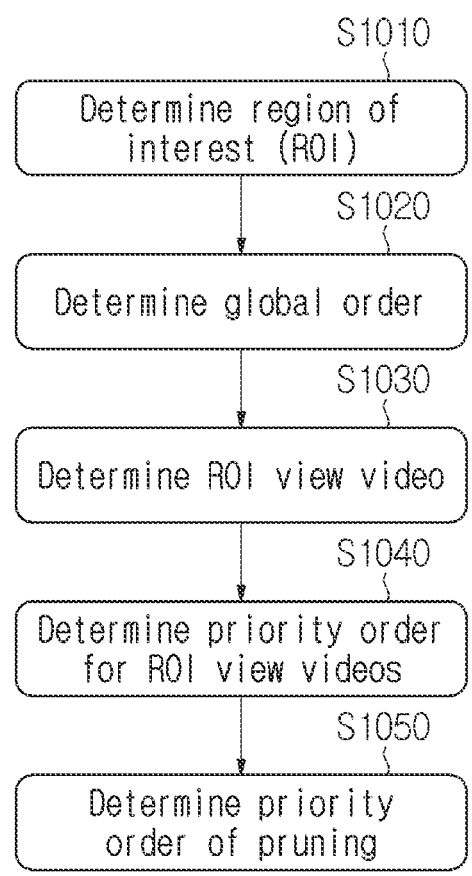
FIG. 10 is a flowchart illustrating a method of determining a priority order of pruning according to an embodiment of the present disclosure.

FIG. 10 is a flowchart illustrating a method of determining a priority order of pruning according to an embodiment of the present disclosure.

First, a region of interest may be set (S1010). At least one of a plurality of view videos may be set as a region of interest. Alternatively, a predetermined spatial region included in a view video, a predetermined region in 3D space, or a predetermined object may be set as a region of interest.

Herein, a region of interest may be selected beforehand according to the intention of a producer capturing a scene and be input into an immersive video processing apparatus.

Alternatively, a region of interest may be determined by analyzing a plurality of view videos. For example, on the basis of a view video/region including an object with much motion in a scene or depth information, at least one of view videos/regions where many objects relatively adjacent to a viewer are distributed may be set as a region of interest.

A global order for all the additional view videos may be determined (S1020). A global order may be determined based on the size/ratio of a region overlapping with a basic view video.

For example, a residual video of each additional view video includes data of a region that is unseen in a basic view video, that is, data of a region that is occluded by an object appearing in a basic view video. In order to enable residual data to be clustered around an area occluded by an object appearing in a basic view video, a global order of additional view videos may be determined in an ascending order of overlapping region with the basic view video.

Alternatively, a global order of additional view videos may be determined in the order of size of occluded region that is not seen in a basic view video.

Alternatively, a global order may be determined by using at least one of the embodiments described in FIGS. 6 to 9.

An additional view video related to a region of interest may be determined (S1030). An additional view video related to a region of interest (ROI) may be referred to as a ROI view video.

When a view video is designated as a ROI, the view video may be determined as a ROI view video. In addition, an additional view video spatially adjacent to a view video that is designated as a region of interest or an additional view video having an object overlapping with an object included in a view video that is designated as a ROI may be additionally determined as a ROI view video.

When a predetermined space is designated as a region of interest, an additional view video including data for the space may be determined as a ROI view video.

When there is a plurality of ROI view videos, a priority order among the ROI view videos may be determined (S1040).

For example, when a region of interest is designated as a view video, a priority order among ROI view videos may be determined on the basis of the order of spatial adjacency to the view video or the ratio of an overlapping region with the view video.

Alternatively, when a region of interest is designated as a predetermined space, a priority order among ROI view videos may be determined by considering the ratios of the region of interest in each additional view video. For example, an additional view video including a region of interest at the highest ratio may be set as the highest priority.

On the basis of a priority order and a global order of ROI view videos, a priority order of pruning may be determined for additional view videos (S1050).

Pruning priorities of ROI view videos may be set to be higher than those of additional view videos that are not related to ROI. In addition, a priority order of pruning among ROI view videos may be determined based on the priority order among ROI view videos that are determined in the step S1040, and a priority order of pruning among additional view videos that are not related to ROI may be determined based on the global order determined in the step S1020.

As in the embodiment described above, when the pruning priority of an additional view video having a high ROI ratio is set to be high, residual pixels for ROI are clustered and thus quality may be improved when synthesizing a video including ROI.

However, when a priority order of pruning among additional view videos is determined in the order of ROI ratio, an additional view video that includes not data for the region of interest but information on an occluded region adjacent to the region of interest is relegated to a lower priority. Accordingly, information on the occluded region may be removed by a reference view video with a higher priority.

In addition, when an overlapping region is determined based on depth information, a region that is not to be removed may be removed by a noise. These factors may degrade the quality of a synthesized video.

In order to such a problem, an additional view video including an occluded region adjacent to a region of interest may also be determined as a ROI view video. Thus, the pruning priority of an additional view video including an occluded region adjacent to a region of interest may also be ranked high.

When a priority order of pruning is determined, residual videos for each additional view video may be generated based on the priority order of pruning. A residual video may be a mask video with duplicate data between an additional view video and a reference view video being removed.

During a pruning process, an important part may be falsely determined as an overlapping region and be unintentionally removed To solve such a problem, the size of a mask region may be expanded.

Also, in order to improve the quality of video synthesis for a region of interest, the size of a mask region related to the region of interest within a residual region may be adaptively expanded.

Herein, the expanded size of a mask region may be adaptively determined by considering a pixel value in the mask region, a depth value, or camera information.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and be recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skill in the computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. In order to implement processes according to the present disclosure, the hardware devices may be configured to be operable through one or more software modules or vice versa.

Although the present disclosure has been described in terms of specific items such as detailed elements as well as the limited embodiments and the drawings, they are only provided to help more general understanding of the invention, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the invention.

What is claimed is:

1. An immersive video synthesizing method, the method comprising:
    parsing video data and metadata from a bitstream;
    decoding an atlas from the video data, wherein the atlas comprises a plurality of patches each of which is derived from a residual view generated by pruning a source view with a reference view during a pruning process;
    determining a view index required for synthesizing a viewport video;
    extracting a patch of a first source view which has the determined view index; and
    synthesizing a viewport video based on first data reconstructed by the patch of the first source view,
    wherein the metadata comprise pruning priority information for the first source view,
    wherein the pruning priority information for the first source view comprises a root node flag specifying whether the first source view is a root node or not,
    wherein when the first source view is not pruned during the pruning process, the root node flag has a first value that indicates that the first source view is the root node,
    wherein when the first source view is pruned by at least one reference view, the root node flag has a second value that indicates that the first source view is not the root node,
    wherein in response that the root node flag has the second value, the pruning priority information further comprises reference number information, indicating a number of parent nodes for the first source view, and a hierarchical view index, specifying a view index of at least one reference view which is used to prune the first source view during the pruning process, the hierarchical view index for the first source view being repeatedly decoded as many as the number of parent nodes indicated by the reference number information,
    wherein a patch of a second source view further extracted from the atlas, the second source view being a reference view used to prune the first source view, and
    wherein second data reconstructed by the patch of the second source view is further used to synthesize the viewport video.

2. The immersive video synthesizing method of claim 1, wherein the patch of the second source view comprises redundant data between the first source view and the second source view.

3. The immersive video synthesizing method of claim 2, wherein the second source view is an additional source view which is not the root node on a pruning hierarchical structure.

* * * * *